United States Patent
Kjellqvist et al.

(10) Patent No.: US 7,767,910 B2
(45) Date of Patent: Aug. 3, 2010

(54) SEMICONDUCTIVE COMPOSITIONS

(75) Inventors: Jerker B. L. Kjellqvist, Wadenswill (CH); Marc A. M. Mangnus, Clinge (NL); Suh Joon Han, Belle Mead, NJ (US); Gabriele Goethel, Merseburg (DE)

(73) Assignee: Dow Global Technologies Inc, Midland, MI (US)

( * ) Notice: Subject to any disclaimer, the term of this patent is extended or adjusted under 35 U.S.C. 154(b) by 0 days.

(21) Appl. No.: 12/278,231

(22) PCT Filed: Feb. 5, 2007

(86) PCT No.: PCT/US2007/003165

§ 371 (c)(1),
(2), (4) Date: Aug. 4, 2008

(87) PCT Pub. No.: WO2007/092454

PCT Pub. Date: Aug. 16, 2007

(65) Prior Publication Data

US 2009/0056973 A1   Mar. 5, 2009

(51) Int. Cl.
*H01B 7/00*   (2006.01)
(52) U.S. Cl. .................................. 174/110 R
(58) Field of Classification Search ............. 174/102 R, 174/103, 106 R, 110 R, 110 SC, 105 SC, 174/120 SC; 252/511, 500, 510; 428/323, 428/367, 372
See application file for complete search history.

(56) References Cited

U.S. PATENT DOCUMENTS

| | | | | |
|---|---|---|---|---|
| 4,514,620 A | * | 4/1985 | Cheng et al. | 219/553 |
| 4,578,431 A | | 3/1986 | Shaw et al. | |
| 4,857,600 A | | 8/1989 | Gross et al. | |
| 4,929,388 A | * | 5/1990 | Wessling | 252/500 |
| 5,371,134 A | * | 12/1994 | Inoue | 524/495 |
| 5,556,697 A | * | 9/1996 | Flenniken | 428/323 |
| 5,575,965 A | | 11/1996 | Caronia et al. | |
| 5,580,493 A | * | 12/1996 | Chu et al. | 252/511 |
| 5,889,117 A | * | 3/1999 | Flenniken | 525/222 |
| 6,277,303 B1 | * | 8/2001 | Foulger | 252/500 |
| 6,455,771 B1 | * | 9/2002 | Han et al. | 174/388 |

FOREIGN PATENT DOCUMENTS

| WO | WO-01/64785 | 9/2001 |
|---|---|---|
| WO | WO-02/073630 | 9/2002 |

OTHER PUBLICATIONS

Introduction to Polymer Chemistry, Stille, Wiley and Sons, New York, 1962, pp. 149-151.

* cited by examiner

*Primary Examiner*—William H Mayo, III

(57) ABSTRACT

A polymer composite is made from or containing: (i) a phase I material consisting essentially of a polar copolymer of ethylene and an unsaturated ester having 4 to 20 carbon atoms; (ii) a phase II material consisting essentially of a nonpolar, low density polyethylene; and (iii) a conducting filler material dispersed in the phase I material and/or the phase II material in an amount sufficient to be equal to or greater than the amount required to generate a continuous conducting network in the phase I and phase II materials. Articles are made from the polymer composite.

6 Claims, No Drawings

SEMICONDUCTIVE COMPOSITIONS

TECHNICAL FIELD

This invention relates to semiconductive compositions for use in power cable, particularly medium and high voltage power cable.

BACKGROUND INFORMATION

A typical electric power cable generally comprises one or more conductors in a cable core that is surrounded by several layers of polymeric materials including a first semiconductive shield layer (conductor or strand shield), an insulating layer, a second semiconductive shield layer (insulation shield), a metallic tape or wire shield, and a protective jacket. The outer semiconductive shield can be either bonded to the insulating layer or strippable. Additional layers within this construction such as moisture impervious materials are often incorporated.

Polymeric semiconductive shields have been utilized in multilayered power cable construction for many decades. Generally, they are used to fabricate solid dielectric power cables rated for voltages greater than 1 kilovolt (kV). These shields are used to provide layers of intermediate conductivity between the high potential conductor and the primary insulation, and between the primary insulation and the ground or neutral potential. The volume resistivity of these semiconductive materials is typically in the range of $10^{-1}$ to $10^8$ ohm-cm when measured on a completed power cable construction using the methods described in ICEA S-66-524, section 6.12, or IEC 60502-2 (1997), Annex C.

Typical shield compositions contain a polyolefin, such as ethylene/vinyl acetate copolymer, conductive carbon black, an organic peroxide crosslinking agent, and other conventional additives, processing aids, and antioxidants. These compositions are usually prepared in granular or pellet form.

The shield composition is, typically, introduced into an extruder where it is co-extruded around an electrical conductor at a temperature lower than the decomposition temperature of the organic peroxide to form a cable. The cable is then exposed to higher temperatures at which the organic peroxide decomposes to provide free radicals, which crosslink the polymer.

In order to provide a semiconductive shield, it is necessary to incorporate conductive particles (conductive filler) into the composition. Industry is constantly attempting to reduce the conductive filler loading and thus reduce formulation cost while maintaining a sufficient level of electrical conductivity and improve processability through reduced viscosity.

DISCLOSURE OF THE INVENTION

An object of this invention, therefore, is to provide a multiphase semiconductive shield composition with reduced conductive filler loading while maintaining a high level of conductivity and improving processability. Other objects and advantages will become apparent hereinafter.

According to the invention, such a composition has been discovered. The semiconductive shield composition is a polymer composite comprising:

(i) a phase I material consisting essentially of a polar copolymer of ethylene and an unsaturated ester having 4 to 20 carbon atoms;
(ii) a phase II material consisting essentially of a nonpolar, low density polyethylene; and
(iii) a conducting filler material dispersed in the phase I material and/or the phase II material in an amount sufficient to be equal to or greater than the amount required to generate a continuous conducting network in the phase I and phase II materials.

DESCRIPTION OF THE PREFERRED EMBODIMENT(S)

The phase I material consists essentially of a polar copolymer of ethylene and an unsaturated ester. The polar copolymers are generally made by high pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 pounds per square inch (psi) and the temperature is in the range of 175 to 250 degrees Celsius, and in the tubular reactor, the pressure is in the range of 25,000 to 45,000 psi and the temperature is in the range of 200 to 350 degrees Celsius.

The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms.

In semiconductive shields, the portion of the copolymer attributed to the ester comonomer can be in the range of about 10 to about 55 percent by weight based on the weight of the copolymer, and is preferably in the range of about 15 to about 30 percent by weight. In terms of mole percent, the ester comonomer can be present in an amount of 5 to 30 mole percent. The ester can have 4 to 20 carbon atoms, and preferably has 4 to 7 carbon atoms Examples of vinyl esters (or carboxylates) are vinyl acetate, vinyl butyrate, vinyl pivalate, vinyl neononanoate, vinyl neodecanoate, and vinyl 2-ethylhexanoate. Vinyl acetate is preferred. Examples of acrylic and methacrylic acid esters are lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. The alkyl group can be substituted with an oxyalkyltrialkoxysilane, for example.

The copolymers can have a density in the range of 0.900 to 0.990 gram per cubic centimeter, and preferably have a density in the range of 0.920 to 0.970 gram per cubic centimeter. The copolymers can also have a melt index in the range of 0.1 to 100 grams per 10 minutes, preferably have a melt index in the range of 1 to 50 grams per 10 minutes, and more preferably, in the range of 5 to 21 grams per 10 minutes.

The phase I material can be present in the composite in an amount of 10 to 80 percent by weight based on the weight of the composite, and is preferably present in an amount of 20 to 60 percent by weight.

The phase II material consists essentially of a nonpolar, low density polyethylene (LDPE) prepared as a homopolymer of ethylene and generally by a high pressure process. As previously noted, a conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 psi and the temperature is in the range of 175 to 250 degrees Celsius, and in the tubular reactor, the pressure is in the range of 25,000 to 45,000 psi and the temperature is in the range of 200 to 350 degrees Celsius.

These LDPE polymers have a density between about 0.910 grams per cubic centimeter and about 0.940 grams per cubic centimeter as measured by ASTM D-792.

The non-polar low density polyethylene preferably has a polydispersity (Mw/Mn) the range of 1.1 to 10. Mw is defined as weight average molecular weight and Mn is defined as number average molecular weight. The Mw is preferably in the range of 10,000 to 1,000,000. They also can have a melt index in the range of 0.25 to 30 grams per 10 minutes, preferably, in the range of 1 to 20 grams per 10 minutes, and more preferably, in the range of 5 to 10 grams per 10 minutes.

The phase II material can be present in the composite in an amount of 10 to 80 percent by weight based on the weight of the composite, and is preferably present in an amount of 20 to 60 percent by weight.

It is found that the phase I and phase II materials become compatible in combination even though they are, respectively, polar and non-polar materials. However, the two materials do not become miscible. Rather, they simply do not enter into a completely homogeneous state.

While not being bound by any particular theory, it is believed that, as the phase I and phase II materials are mixed together in the melt state, the polymers separate and form into distinct phases. Phase separation may be due to incomplete miscibility between two polymer melts or it may be caused by different crystallization from each component, or from both factors simultaneously.

As carbon black is compounded into polymer blends to make a conductive polymer blend composite, the carbon black aggregates form a tunneling network. To promote a high level of carbon black aggregate network in the formulation, it is preferable for the hosting polymer that the carbon black be continuous in terms of phase morphology.

The composite of the invention utilizes (a) a polymer fluid mechanic principle for phase dispersion and (b) phase continuity in the blended system to optimize the hosting condition for carbon black distribution in one step mixing. In the stratified two phases of the polymer melt, the larger volume phase, or low viscosity phase, tends to be more continuous in the resulting polymer blend.

Optionally, additional phases of other polymeric materials can be introduced into the composite if they have properties corresponding to the properties of either the phase I material or the phase II material.

The phase morphology of the polymer blends can be explained qualitatively by considering the distribution of phase in a stratified two phase flow of polymer melts. The level of dispersion in incompatible polymer melts can vary depending on the nature of the polymer pair and deformation. In general, polymer pairs with similar viscosity and chemical character are known to blend easily. The former is based on the hydrodynamic stability standpoint that the efficiency to have an immiscible droplet deformed and break-up into a matrix phase would be the highest with the viscosity ratio between the two phases around unity.

The critical Weber number, which is a measure of the effort required to break up a droplet, for both shearing and extensional flow fields, is at a minimum at the viscosity ratio of about 1. The mixing requirement is much lower in an extensional flow field (such as the one in a Buss™ co-kneader) than that in a shearing field (in a conventional single screw extruder). It is also known that the extended droplets in the shear field break up into smaller droplets when the viscosity ratio of the two components is of the order of unity, but less than 4. However, the volume ratio is also another major factor for the distributive and dispersive mixing of two polymers.

The polymers can be made moisture curable by making the resin hydrolyzable, which is accomplished by adding hydrolyzable groups such as —$Si(OR)_3$ wherein R is a hydrocarbyl radical to the resin structure through copolymerization or grafting. Suitable grafting agents are organic peroxides such as dicumyl peroxide; 2,5-dimethyl-2,5-di(t-butylperoxy)hexane; t-butyl cumyl peroxide; and 2,5-dimethyl-2,5-di(t-butylperoxy)hexane-3. Dicumyl peroxide is preferred. Hydrolyzable groups can be added, for example, by copolymerizing ethylene with an ethylenically unsaturated compound having one or more —$Si(OR)_3$ groups such as vinyltrimethoxysilane, vinyltriethoxysilane, and gamma-methacryloxypropyltrimethoxy-silane or grafting these silane compounds to the resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

The conducting filler material (conductive particles) can be a conventional conductive carbon black commonly used in semiconductive shields. These conductive particles have been generally provided by particulate carbon black. Useful carbon blacks can have a surface area of 50 to 1000 square meters per gram. The surface area is determined under ASTM D 4820-93a (Multipoint B.E.T. Nitrogen Adsorption). The carbon blacks can be used in the semiconductive shield composition in an amount of 10 to 50 percent by weight based on the weight of the composition, and are preferably used in an amount of 15 to 45 percent by weight, more preferably 25 to 35 percent by weight. This can be referred to as conductive filler loading, and most preferably 27 to 33 percent by weight.

Both standard conductivity and high conductivity carbon blacks can be used with standard conductivity blacks being preferred. Examples of conductive carbon blacks are the grades described by ASTM N550, N472, N351, N110, Ketjen blacks, furnace blacks, and acetylene blacks.

Carbon black is elemental carbon in the form of spheroidal colloidal particles and coalesced particle aggregates, manufactured by the thermal decomposition of hydrocarbons. Although the carbon black has less order than graphite, carbon black microstructure is graphitic in nature. One of key characteristics of carbon black is the high degree of porosity and hollowing at the core of the carbon black particle. Carbon blacks are known as intrinsic semiconductors.

When carbon black is added into a polymer matrix to a certain level, the carbon black aggregates form a continuous path and become a conductive polymer composite. In the electron tunneling theory, electron flow occurs when the carbon black aggregates are in contact or separated by less than a critical distance, or percolation distance, which has been suggested to be about 100 Angstroms or less. In a sense, electrons tunnel through the resistive polymer from aggregate to aggregate. As the aggregates are increasingly more in contact or close enough for tunneling to occur, the electrical conductivity of the polymer composite increases. Percolation is the point where the polymer composite makes a transition from insulating to conducting system. However, processability of the polymer formulation must also be considered to balance overall performance of the product in power cables. As the carbon black content decreases, it is easier to extrude.

Carbon nanotubes can also be used.

Conductive fillers other than carbon black or carbon nanotubes can also be used. Examples are metallic particles, fullerenes, and conductive polymers such as polyacetylene, polyparaphenylene, polypyrrole, polythiophene, and polyaniline.

Optionally, a copolymer of acrylonitrile and butadiene wherein the acrylonitrile is present in an amount of 20 to 60 percent by weight based on the weight of the copolymer, and is preferably present in an amount of 30 to 40 percent by weight, can be included in the semiconductive shield composition. This copolymer is usually used in a strippable insulation shield rather than the conductor or strand shield. The copolymer is also known as a nitrile rubber or an acrylonitrile/butadiene copolymer rubber. The density can be, for example, 0.98 gram per cubic centimeter and the Mooney Viscosity can be (ML 1+4) 50. A silicone rubber can be substituted for the nitrile rubber, if desired.

Optionally, the composition of the present invention can contain other polyolefins, including ethylene alpha-olefin copolymers, in an amount of less than about 25 percent by weight based upon the weight of the total polymers present.

The phase I and phase II materials can be crosslinked. This is accomplished in a conventional manner with an organic peroxide or irradiation, the former being preferred. The amount of organic peroxide used can be in the range of 0.3 to 5 percent, and is preferably in the range of 0.5 to 3 percent by weight, based on the weight of the composite. Organic peroxide crosslinking temperatures can be in the range of 125 to 250 degrees Celsius and are preferably in the range of 135 to 210 degrees Celsius.

Examples of organic peroxides useful in crosslinking are dicumyl peroxide; t-butyl cumyl peroxide; lauroyl peroxide; benzoyl peroxide; tertiary butyl perbenzoate; di(tertiary-butyl) peroxide; t-butylperoxydiisopropyl-benzene; cumene hydroperoxide; 2,5-dimethyl-2,5-di(t-butyl-peroxy)hexyne-3; 2,5-dimethyl-2,5-di(t-butyl-peroxy)hexane; tertiary butyl hydroperoxide; isopropyl percarbonate; and alpha,alpha'-bis(tertiary-butylperoxy)diisopropylbenzene.

Irradiation is typically effected by electron beam. The composition in pellet form is subjected to an electron beam at a given dose rate or exposed to a Gamma source of specific strength for a given period of time to impart a specific dose rate of radiation.

Conventional additives, which can be introduced into the composition, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than 0.1 to more than 50 percent by weight (the higher amounts are generally for fillers) based on the weight of the composite.

Examples of antioxidants are: hindered phenols such as tetrakis[methylene(3,5-di-tert-butyl-4-hydroxyhydro-cinnamate)]methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphates and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha,alpha-dimethylbenzyl)diphenylamine, and alkylated diphenylamines. Antioxidants can be used in amounts of 0.1 to 5 percent by weight based on the weight of the composite.

Compounding can be effected in a conventional melt/mixer or in a conventional extruder, preferably in one step, and the terms melt/mixer and extruder are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. The semiconductive shield composition of the invention can be prepared in various types of melt/mixers and extruders such as a Brabender™ mixer, Banbury™ mixer, a roll mill, a Buss™ co-kneader, a biaxial screw kneading extruder, and single or twin screw extruders. A description of a conventional extruder can be found in U.S. Pat. No. 4,857,600.

In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of 15:1 to 30:1. In wire coating, where the material is crosslinked after extrusion, the die of the crosshead feeds directly into a heating zone, and this zone can be maintained at a temperature in the range of 120 degrees Celsius to 260 degrees Celsius, and preferably in the range of 140 degrees Celsius to 220 degrees Celsius.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

The term "surrounded" as it applies to a substrate being surrounded by an insulating composition, jacketing material, semiconductive shield, or other cable layer is considered to include extruding around the substrate; coating the substrate; or wrapping around the substrate as is well known by those skilled in the art. The substrate can include, for example, a core including a conductor or a bundle of conductors, or various underlying cable layers.

EXAMPLES

The following non-limiting examples illustrate the invention.

Example 1 and Comparative Example 2

The compositions for Example 1 and Comparative Example 2 were prepared using the formulation set forth in Table I and compounded on a Buss co-kneader type B-46. The amounts of each component are set forth in weight percents.

Table I also sets forth the results of the volume resistivity (VR) and capillary rheology tests. The volume resistivity test was measured via IEC 6093 using conductive paint at 23 degrees Celsius and 90 degrees Celsius after pre conditioning. The capillary rheology tests were performed at 120 degrees Celsius with the Goettfert capillary rheometer, the Rheograph 6000, triple bore, and piston diameter of 12 mm. A die of 20/1 was used. The applied apparent shear rates were in the range of 50 to 10000 $sec^{-1}$. The shear rate is set forth as Ex. 1/Comp. Ex. 2, where the first value is for Example 1 and the second value is for Comparative Example 2 such that 348/370 indicates that 348 reciprocal seconds is for Example 1 while 370 reciprocal seconds is for Comparative Example 2.

TABLE I

| Component | Example 1 | Comp. Example 2 |
| --- | --- | --- |
| low density polyethylene | 39.28 | 0 |
| ethylene/ethyl acrylate copolymer | 29.16 | 65.47 |
| carbon black | 29.67 | 32.64 |
| antioxidant | 0.79 | 0.79 |
| organic peroxide | 1.10 | 1.10 |

| Volume Resistivity (ohm cm) | | |
| --- | --- | --- |
| 23 degrees Celsius | 10 | 11.8 |
| 90 degrees Celsius | 40 | 51.5 |

| Capillary Rheology | |
| --- | --- |
| Shear Rate (1/second) (Ex. 1/Comp. Ex. 2) | Melt Viscosity (Pa sec) |
| 48/48 | 2697 3872 |
| 130/131 | 1322 1808 |
| 348/370 | 654 820 |
| 841/890 | 382 464 |
| 1821/1949 | 224 262 |

The low density polyethylene (LDPE) had a density of 0.919 grams per cubic centimeter and a melt index of 8.7 grams per 10 minutes.

The ethylene/ethyl acrylate (EEA) copolymer had a density of 0.931 grams per cubic centimeter and a melt index of 6 grams per cubic centimeter. The EEA copolymer contains 18.5 percent ethyl acrylate by weight.

The carbon black had a surface area of about 68 square meters per gram. It was commercially available from Cabot Corporation as XC500. The antioxidant was Agerite™ MA polymerized 1,2-dihydro-2,2,4 trimethyl quinoline and commercially available from R.T. Vanderbilt Company. The organic peroxide used was Vulcup™ t-butylperoxydiisopropyl-benzene and commercially available from Geo Specialty Chemicals.

Example 3 and Comparative Examples 4 and 5

The compositions for Example 3 and Comparative Examples 4 and 5 were prepared using the formulations set forth in Table II and compounded on a Buss co-kneader type B-46. The amounts of each component are set forth in weight percents.

Table II also sets forth the results of the volume resistivity (VR) and percent elongation to break tests. The volume resistivity test was measured via IEC 6093 using conductive paint at 23 degrees Celsius and 90 degrees Celsius after pre conditioning. The percent elongation was measured using TIRA Test 2420 available from Thüringer Maschinenbau GmbH according to IEC 60811-1-1/IEC 60811-1-2.

The same LDPE, EEA copolymer, carbon black, and organic peroxide were used to prepare Example 3 and Comparative Examples 4 and 5 as were used in Example 1 and Comparative Example 2. The antioxidant used for Example 3 and Comparative Examples 4 and 5 was Naugard Ultra Q polymerized quinoline antioxidant available from Chemtura Corporation, formerly Crompton Corporation.

TABLE II

| Component | Example 3 | Comp. Ex. 4 | Comp. Ex. 5 |
| --- | --- | --- | --- |
| LDPE | 39.03 | | 65.61 |
| EEA copolymer | 29.35 | 65.61 | |
| carbon black | 29.64 | 32.71 | 32.71 |
| antioxidant | 0.79 | 0.79 | 0.79 |
| organic peroxide | 1.19 | 0.89 | 0.89 |

| Volume Resistivity (ohm cm) | | | |
| --- | --- | --- | --- |
| 23 degrees Celsius | 11.8 | 10.8 | 2.6 |
| 90 degrees Celsius | 51.5 | 37.5 | 8.9 |

| Elongation | | | |
| --- | --- | --- | --- |
| Percent to Break | 265 | 245 | 21.9 |

What is claimed is:

1. A wire comprising a layer selected from the group consisting of jacket, insulation shield, and semiconducting shield prepared from a polymer composite comprising:
   (i) a phase I material consisting essentially of a polar copolymer of ethylene and an unsaturated ester;
   (ii) a phase II material consisting essentially of a nonpolar, low density polyethylene, being a homopolymer of ethylene; and
   (iii) a conducting filler material dispersed in the phase I material and/or the phase II material in an amount sufficient to be equal to or greater than the amount required to generate a continuous conducting network in the phase I and phase II materials.

2. A polymer composite comprising:
   (i) a phase I material consisting essentially of a polar copolymer of ethylene and an unsaturated ester;
   (ii) a phase II material consisting essentially of a nonpolar, low density polyethylene, being a homopolymer of ethylene; and (iii) a conducting filler material dispersed in the phase I material and/or the phase II material in an amount sufficient to be equal to or greater than the amount required to generate a continuous conducting network in the phase I and phase II materials.

3. The polymer composite according to claim 2 wherein the phase I material is present in an amount of 10 to 80 percent by weight based on the weight of the composite.

4. The polymer composite according to claim 2 wherein the phase II material is present in an amount of 10 to 80 percent by weight based on the weight of the composite.

5. The polymer composite according to claim 2 wherein the polar copolymer of the phase I material is hydrolyzable.

6. The polymer composite according to claim 2 further comprising a copolymer of acrylonitrile and butadiene.

* * * * *